United States Patent
Yamamura et al.

(10) Patent No.: US 8,265,845 B2
(45) Date of Patent: Sep. 11, 2012

(54) RIGHT-LEFT DRIVING FORCE CONTROL SYSTEM

(75) Inventors: Takuya Yamamura, Okazaki (JP); Yuichi Ushiroda, Okazaki (JP); Kaoru Sawase, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 648 days.

(21) Appl. No.: 12/506,299

(22) Filed: Jul. 21, 2009

(65) Prior Publication Data

US 2010/0023184 A1 Jan. 28, 2010

(30) Foreign Application Priority Data

Jul. 22, 2008 (JP) .............................. P2008-188608
Jul. 22, 2008 (JP) .............................. P.2008-188609

(51) Int. Cl.
*G06F 7/00* (2006.01)
(52) U.S. Cl. .............................. 701/69; 701/84; 701/88
(58) Field of Classification Search ........................ None
See application file for complete search history.

(56) References Cited

U.S. PATENT DOCUMENTS

| | | | | |
|---|---|---|---|---|
| 5,255,192 A * | 10/1993 | Ito et al. | ........................... | 701/90 |
| 6,145,614 A * | 11/2000 | Kimura et al. | ................ | 180/248 |
| 6,810,983 B2 * | 11/2004 | Matsuno | ......................... | 701/69 |
| 6,898,505 B2 * | 5/2005 | Kadota et al. | .................... | 701/71 |
| 6,909,959 B2 * | 6/2005 | Hallowell | ........................ | 701/88 |
| 7,151,991 B2 * | 12/2006 | Iida | .................................. | 701/69 |
| 7,263,424 B2 * | 8/2007 | Motoyama | ....................... | 701/69 |
| 7,493,982 B2 * | 2/2009 | Kurosawa et al. | ............. | 180/248 |
| 2007/0213913 A1 * | 9/2007 | Ushiroda et al. | ................. | 701/82 |

FOREIGN PATENT DOCUMENTS

JP 2008-298191 A 12/2008

* cited by examiner

*Primary Examiner* — Khoi Tran
*Assistant Examiner* — Bao Long T Nguyen
(74) *Attorney, Agent, or Firm* — Birch, Stewart, Kolasch & Birch, LLP (57) ABSTRACT

A right-left driving force control system includes: a selecting unit which: selects an adjusting unit adjusting distribution of a driving force between right and left wheels, when a shifting direction in which the driving force is shifted between the wheels and which is related to a control amount is the same as a first direction towards one of the wheels which has a larger speed; selects a limiting unit adjusting a differential action limiting force, when the shifting direction is the same as a second direction towards one of the wheels which has a smaller speed, and a difference between the wheel speeds is equal to or larger than a threshold value; and maintains the adjusting unit or the limiting unit, which has been selected, when the shifting direction is the same as the second direction, and the difference between the wheel speeds is less than the threshold value; and a control unit which controls the adjusting unit or the limiting unit, which is selected or maintained by the selecting unit, based on the control amount.

6 Claims, 8 Drawing Sheets

RIGHT-LEFT DRIVING FORCE CONTROL SYSTEM

BACKGROUND OF THE INVENTION

The present invention relates to a right-left driving force control system and more particularly to a right-left driving force control technique for maintaining a stable vehicle behavior.

A driving force distributing system has been developed in which a yaw moment acting on a vehicle is controlled by generating a difference in driving force between right and left wheels when the vehicle is making a turn, so as to increase the turning performance of the vehicle.

In such a related-art driving force distributing system, however, although a driving force difference can be generated between the right and left wheels, the driving force difference cannot be limited, leading to a problem that the slippage of right and left drive wheels cannot be suppressed when the vehicle is running straight ahead.

In view of the above problem, another related art of a right-left driving force distributing system has been developed. The right-left driving force distributing system includes a right-left driving force adjusting unit and a differential action limiting unit (refer to JP-A-2008-298191).

In a related-art right-left driving force distributing system like the one described in JP-A-2008-298191 in which a differential action limiting unit is provided in a right-left driving force adjusting unit, a control becomes necessary to use the right-left driving force adjusting unit and the differential action limiting unit independently.

As a conceived controlling approach, an approach can be considered in which a driving force adjusting amount by the right-left driving force adjusting unit and a differential action limiting amount by the differential action limiting unit are calculated individually from a running state of the vehicle, so as to control the right-left driving force adjusting unit and the differential action limiting unit separately.

However, in the approach described above, there is a fear that the right-left driving force adjusting unit and the differential action limiting unit happen to be used concurrently. In the event that the right-left driving force adjusting unit and the differential action limiting unit are used concurrently, there is caused a torque interference due to interlocking, resulting in a problem that the operation efficiency and controllability of the driving force distributing system are reduced.

Although an approach can be considered to prevent such a concurrent operation of both the units in which the right-left driving force adjusting unit and the differential action limiting unit are switched over selectively so that only either of them can be put into operation, there is caused a fear that a drastic change in driving force difference takes places when the right-left driving force adjusting unit and the differential action limiting unit are so switched due to the magnitudes of right-left driving force adjusting amount and differential action limiting amount being different and the behavior of the vehicle becomes discontinuous. In addition, while the vehicle is running straight ahead, the difference in wheel speed between the right and left wheels is frequently reversed left to right or vice versa, and when this happens, so-called hunting is generated between the right-left driving force adjusting unit and the differential action limiting unit, and consequently, there is caused a fear that the behavior of the vehicle becomes discontinuous.

SUMMARY

It is therefore an object of the invention to provide a right-left driving force control system which can manage to employ independently a right-left driving force adjusting unit and a differential action limiting unit as required in accordance with a running state of a vehicle, while maintaining stable the behavior of the vehicle.

In order to achieve the object, according to the invention, there is provided a right-left driving force control system comprising:

a adjusting unit which adjusts distribution of a driving force between right and left wheels of a vehicle;

a limiting unit which adjusts a differential action limiting force that is to be applied between the right and left wheels so as to limit a differential action between the right and left wheels;

a detecting unit which detects wheel speeds of the right and left wheels;

a calculating unit which calculates a control amount in accordance with a running state of the vehicle;

a selecting unit which:
  selects the adjusting unit, when a shifting direction in which the driving force is shifted between the right and left wheels and which is related to the control amount is the same as a first direction towards one of the right and left wheels which has a larger wheel speed of the right and left wheel speeds;
  selects the limiting unit, when the shifting direction is the same as a second direction towards one of the right and left wheels which has a smaller wheel speed of the right and left wheel speeds, and a difference between the right and left wheel speeds is equal to or larger than a first threshold value; and
  maintains the adjusting unit or the limiting unit, which has been selected, when the shifting direction is the same as the second direction, and the difference between the right and left wheel speeds is less than the first threshold value; and a control unit which controls the adjusting unit or the limiting unit, which is selected or maintained by the selecting unit, based on the control amount.

The selecting unit may select the limiting unit, when a direction indicated by the difference between the right and left wheel speeds is reversed left to right or vice versa at the same time as the shifting direction is reversed left to right or vice versa from a state in which the shifting direction is the same as the second direction, and the difference between the right and left wheel speeds is less than the first threshold value.

The selecting unit may set the first threshold value to a limit value which can be controlled by the adjusting unit.

The selecting unit may select the limiting unit, when the shifting direction is the same as the second direction, and the control amount is equal to or larger than a second threshold value, and may maintain the adjusting unit or the limiting unit, which has been selected, when the shifting direction is the same as the second direction, and the control amount is less than the second threshold value.

The selecting unit may select the limiting unit, when a direction indicated by the difference between the right and left wheel speeds is reversed left to right or vice versa at the same time as the shifting direction is reversed left to right or vice versa from a state in which the shifting direction is the same as the second direction, and the control amount is less than the second threshold value.

The selecting unit may set the second threshold value to a limit value that can be controlled by the adjusting unit.

DETAILED DESCRIPTION OF EMBODIMENTS

Hereinafter, a mode for carrying out the invention will be described based on the accompanying drawings.

Figure 1:
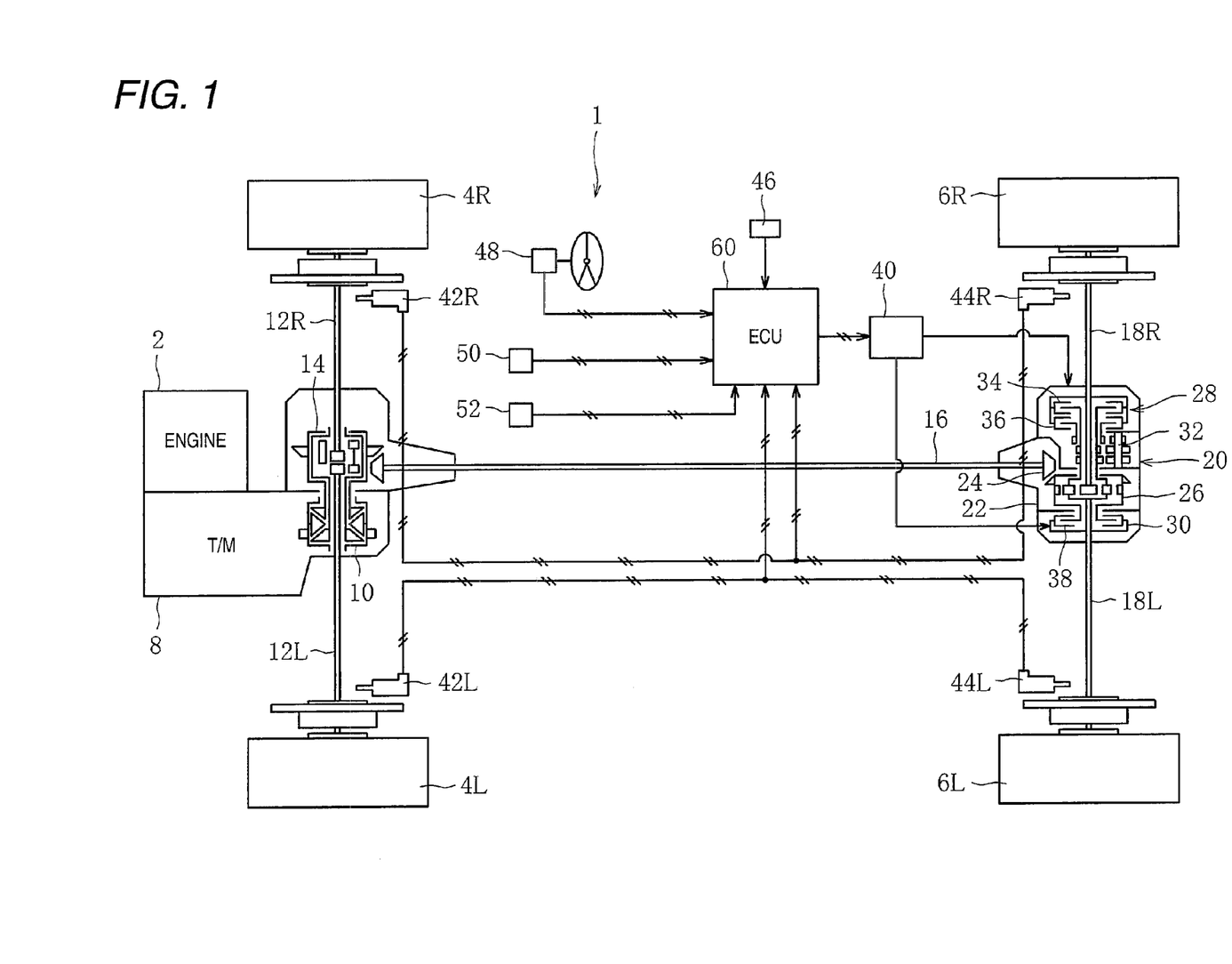
FIG. 1 is a schematic diagram showing the configuration of a right-left driving force control system according to the invention.

A vehicle 1 shown in FIG. 1 is a four-wheel-drive vehicle in which an engine 2 is installed in a front part of a vehicle body and which includes as drive wheels a left front wheel 4L, a right front wheel 4R (both the front wheels being referred to as front wheels 4 from time to time), a left rear wheel 6L and a right rear wheel 6R (both the rear wheels being referred to as rear wheels 6 from time to time).

Specifically, the vehicle 1 includes the engine 2 which is installed in the front part of the vehicle body as a drive source, a transmission 8 which is connected to one side of the engine 2, a center differential 10 which is connected to the transmission 8 for distributing a driving force of the engine 8 to the front wheels 4 side and the rear wheels 6 side, a front differential 14 for distributing individually the driving force distributed to the front wheels 4 side by the center differential 10 to front wheel half shafts 12L, 12R for the left front wheel 4L and the right front wheel 4R, a propeller shaft 16 for transferring the driving force distributed by the center differential 10 to the rear wheels 6 side, and a right-left driving force distributing unit 20 which is connected to one end of the propeller shaft 16 for distributing individually the driving force to rear wheel half shafts 18L, 18R of the left rear wheel 6L and the right rear wheel 6R in accordance with a running state of the vehicle 1.

Since the engine 2, the transmission 8, the center differential 10, and the front differential 14 are related-art devices, the right-left driving force distributing unit 20 will hereinafter be described in detail.

Figure 2:
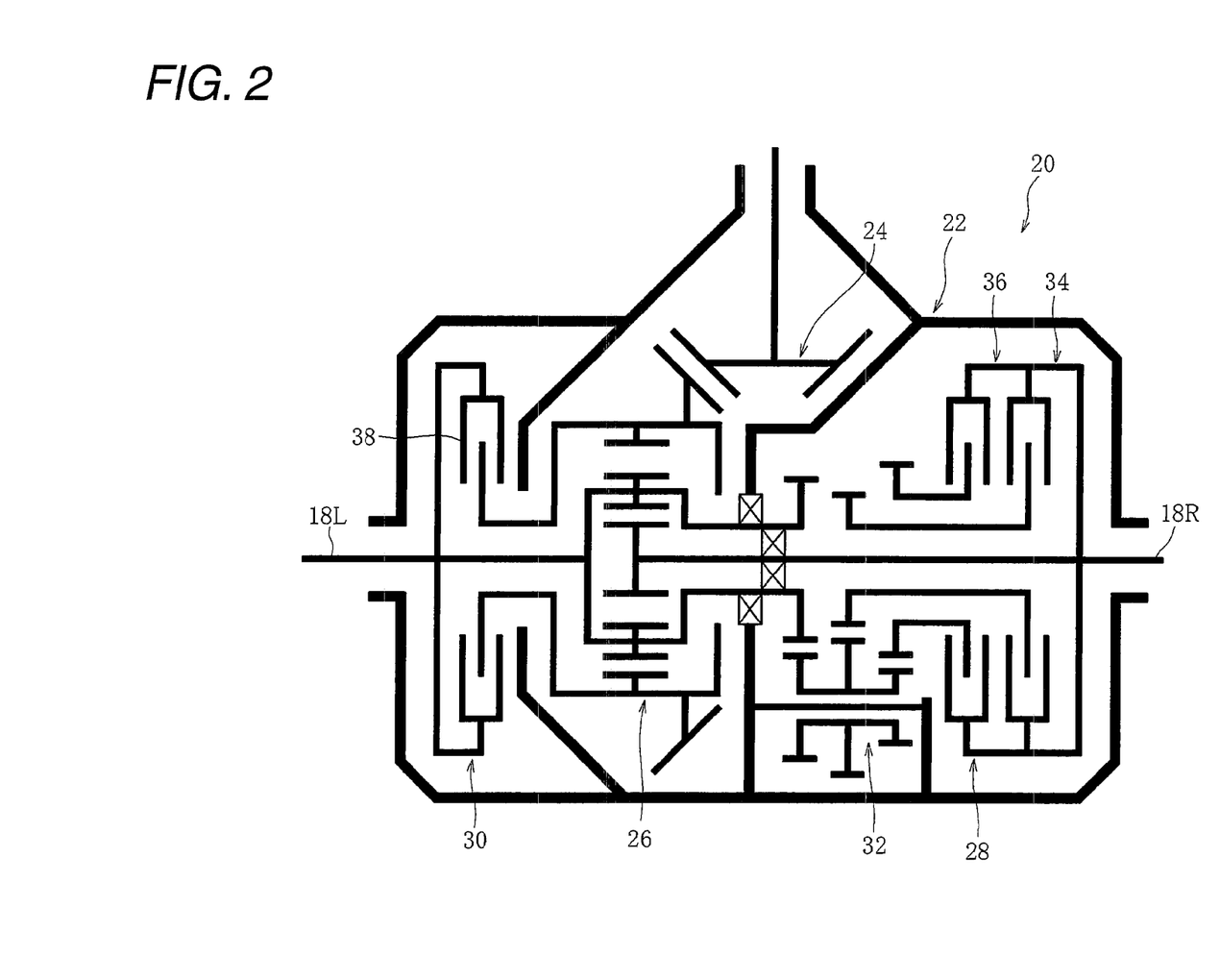
FIG. 2 is an enlarged view of a part of a driving force distributing unit.

As is shown in FIG. 2, the right-left driving force distributing unit 20 includes an input part 24 which makes the one end of the propeller shaft 16, a differential mechanism part 26 which is connected to the input part 24 and is installed on the left rear wheel half shaft 18L and the right rear wheel half shaft 18R, a right-left driving force adjusting mechanism part 28 which is installed on the right rear wheel half shaft 18R, and a differential action limiting mechanism part 30 which is installed on the left rear wheel half shaft 18L, and these constituent components are accommodated within a body casing 22.

In addition, the right-left driving force distributing unit 20 functions to transfer the driving force which is inputted from the propeller shaft 16 to the right and left rear wheel half shafts 18L, 18R while permitting a difference in rotation in terms of speed or distance between the right and left rear wheels 6L, 6R in the differential mechanism part 26 and to distribute the driving force between the right and left rear wheels 6L, 6R by shifting the driving force which is to be transferred to one of the right and left rear wheels 6L, 6R to the other wheel as the driving force which is to be transferred thereto by the use of the right-left driving force adjusting mechanism part 28. The right-left driving force adjusting mechanism part 28 includes a wheel speed increasing/decreasing mechanism 32 for increasing and decreasing the speed of one of the right and left rear wheels 6L, 6R to a faster speed and a slower speed than the other wheel, a right clutch 34 for shifting the driving force from the left rear wheel 6L to the right rear wheel 6R by being engaged, and a left clutch 36 for shifting the driving force from the right rear wheel 6R to the left rear wheel 6L by being engaged.

In addition, a so-called differential action limiting clutch 38 which is made up of a multi-plate friction clutch is provided in the differential action limiting mechanism part 30 of the right-left driving force distributing unit 20. Thus, the differential action limiting mechanism part 30 functions to limit a differential action between the right and left rear wheels 6L, 6R by engaging the differential action limiting clutch 38. Namely, in the event that the differential action limiting clutch 38 is engaged when there is being generated a wheel speed difference between the right and left rear wheels 6L, 6R, the driving force is made to shift from the wheel having a larger wheel speed to the wheel having a smaller wheel speed.

The differential action limiting clutch 38 of the differential action limiting mechanism part 30 and the right clutch 34 and the left clutch 36 of the right-left driving force adjusting mechanism part 28 are actuated by virtue of hydraulic pressure from a hydraulic unit 40 installed in the vehicle 1.

In addition, wheel speed sensors 42L, 42R, 44L, 44R are provided on the respective wheels 4L, 4R, 6L, 6R of the vehicle 1 for detecting respective wheel speeds thereof.

Further, provided in the vehicle 1 are various sensors including a yaw rate sensor 46 for detecting a yaw rate of the vehicle 1, a steering angle sensor 48 for detecting a steering angle, a vehicle body speed sensor 50 for detecting a speed of the vehicle body and a throttle position sensor 52 for detecting a throttle position.

These sensors are electrically connected to an ECU (Electronic Control Unit) 60 which is installed on the vehicle 1.

This ECU 60 controls various units based on sensor information detected by the various sensors.

For example, the ECU 60 functions to control the right-left driving force adjusting mechanism part 28 and the differential action limiting mechanism part 30 of the right-left driving force distributing unit 20.

Figure 3:
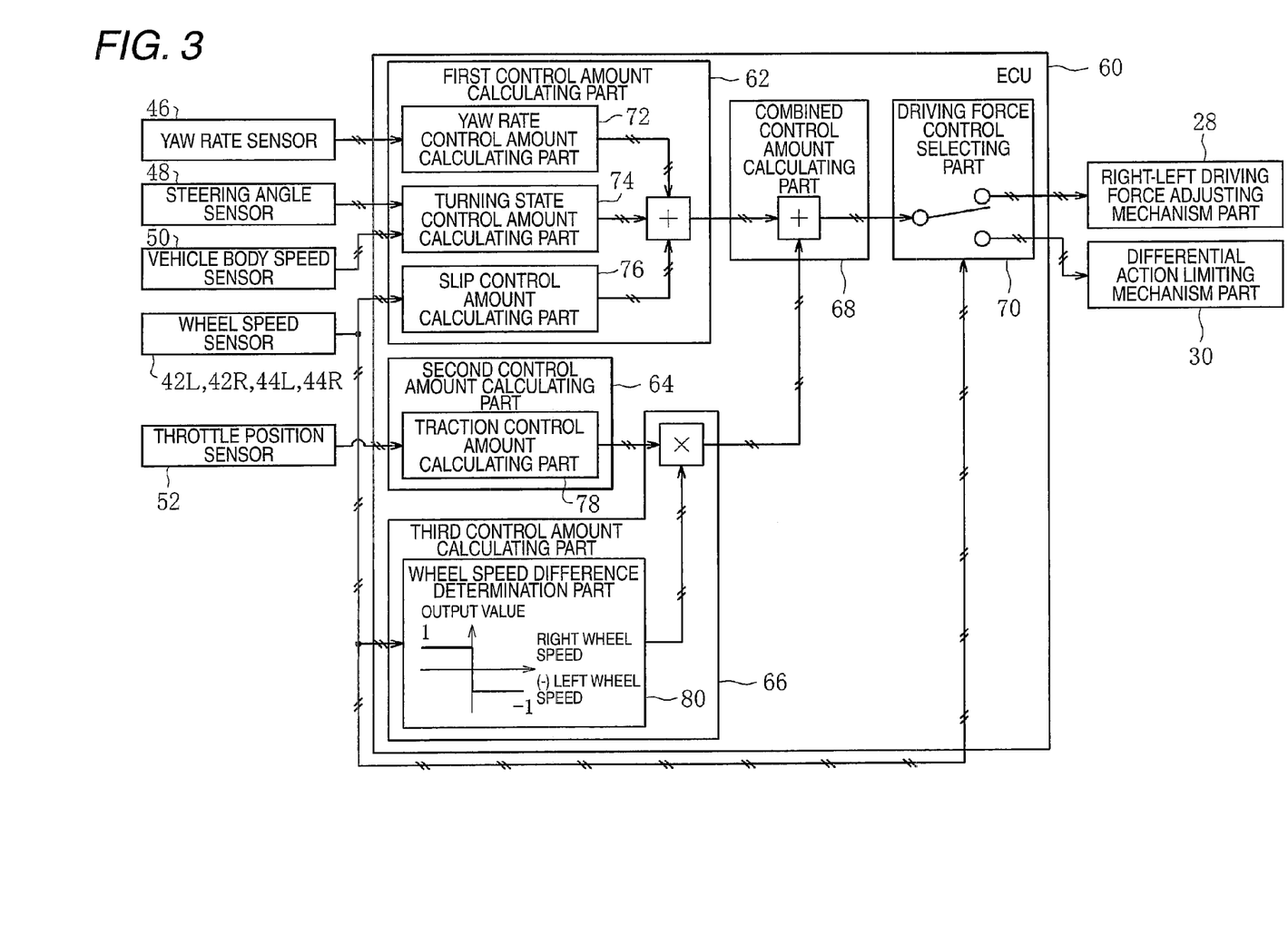
FIG. 3 is a block diagram showing an input/out relationship of an ECU.

Specifically, as is shown in FIG. 3, formed within the ECU 60 are a first control amount calculating part 62, a second control amount calculating part 64, a third control amount calculating part 66, a combined control amount calculating part 68, and a driving force control selecting part 70.

The first control amount calculating part 62 includes a yaw rate control amount calculating part for calculating a yaw rate control amount in accordance with a difference between a target yaw rate and the actual yaw rate from a detection result from the yaw rate sensor 46, a turning state control amount calculating part 74 for calculating a turning state control amount in accordance with the steering angle and the vehicle body speed of the vehicle from detection results from the steering angle sensor 48 and the vehicle body speed sensor 50 and a slip control amount calculating part 76 for calculating a slip control amount in accordance with the specific sliding of the wheel from detection results from the rear wheel speed sensors 44L, 44R.

In addition, this first control amount calculating part 62 has a function to calculate a first control amount into which respective control amounts calculated at the yaw rate control amount calculating part 72, the turning state control amount calculating part 74 and the slip control amount calculating part 76 are added. This first control amount is a control amount for controlling the right-left driving force adjusting mechanism part 28, that is, an engagement control amount of the right clutch 34 or the left clutch 36. Consequently, a right-left driving force shifting direction in the rear wheels 6 is included in (related to) the control amount, and for example, the shifting of driving force to the right rear wheel 6R through engagement of the right clutch 34 is shown by a positive value, whereas the shifting of driving force to the left rear wheel 6L through engagement of the left clutch 36 is shown by a negative value.

In addition, the second control amount calculating part 64 includes a traction control amount calculating part 78 for calculating a traction control amount in accordance with the throttle position from a detection result of the throttle position sensor 52. This second control amount calculating part 64 has a function to calculate a second control amount for controlling the differential action limiting mechanism part 30 based on the traction control amount so calculated. This second control amount is an engagement control amount of the differential action limiting clutch 38.

Further, the third control amount calculating part 66 includes a wheel speed difference determination part 80 for determining which of the right and left rear wheels 6 has a larger wheel speed from the right and left wheel speed difference which is obtained from the detection results of the rear wheel speed sensors 44L, 44R. The wheel speed difference determination part 80 outputs an output value of −1 in the event that a value resulting when the wheel speed of the left rear wheel 6L is subtracted from the wheel speed of the right rear wheel 6R is positive and outputs an output value of 1 in the event that the value so resulting is negative. Namely, in the event that wheel speed of the right rear wheel 6R is larger than that of the left rear wheel 6L, the output value becomes −1, whereas in the event that the wheel speed of the left rear wheel 6L is larger than the right rear wheel 6R, the output value becomes 1.

In addition, the third control amount calculating part 66 has a function to calculate a third control amount by multiplying the second control amount which is calculated at the second control amount calculating part 64 by the output value from the wheel speed difference determination part 80. Namely, the third control amount is a control amount made up of the second control amount which includes a driving force shifting direction in which a differential action is suppressed. Consequently, as with the driving force shifting direction in the first control amount calculating part 62, in this third control amount, the shifting of driving force to the right rear wheel 6R is shown by a positive value, and the shifting of driving force to the left rear wheel 6L is shown by a negative value.

In addition, the combined control amount calculating part 68 has a function to calculate a combined control amount by adding together the first control amount which is calculated at the first control amount calculating part 62 and the third control amount which is calculated at the third control amount calculating part 66. Note that since the first and third control amounts are individually the control amounts which include (are related to) the driving force shifting directions, the resulting combined control amount also becomes a control amount which includes (is related to) a driving force shifting direction.

Additionally, the driving force control selecting part 70 has a function to select either the implementation of right-left driving force adjusting control by the right-left driving force adjusting mechanism part 28 or the implementation of differential action limiting control by the differential action limiting mechanism part 30 from the relationship between the driving force shifting direction included in (related to) the combined control amount which is calculated by the combined control amount at the combined control amount calculating part 68 and the right and left wheel speed difference which is obtained from the detection results of the rear wheel speed sensors 44L, 44R.

Figure 4:
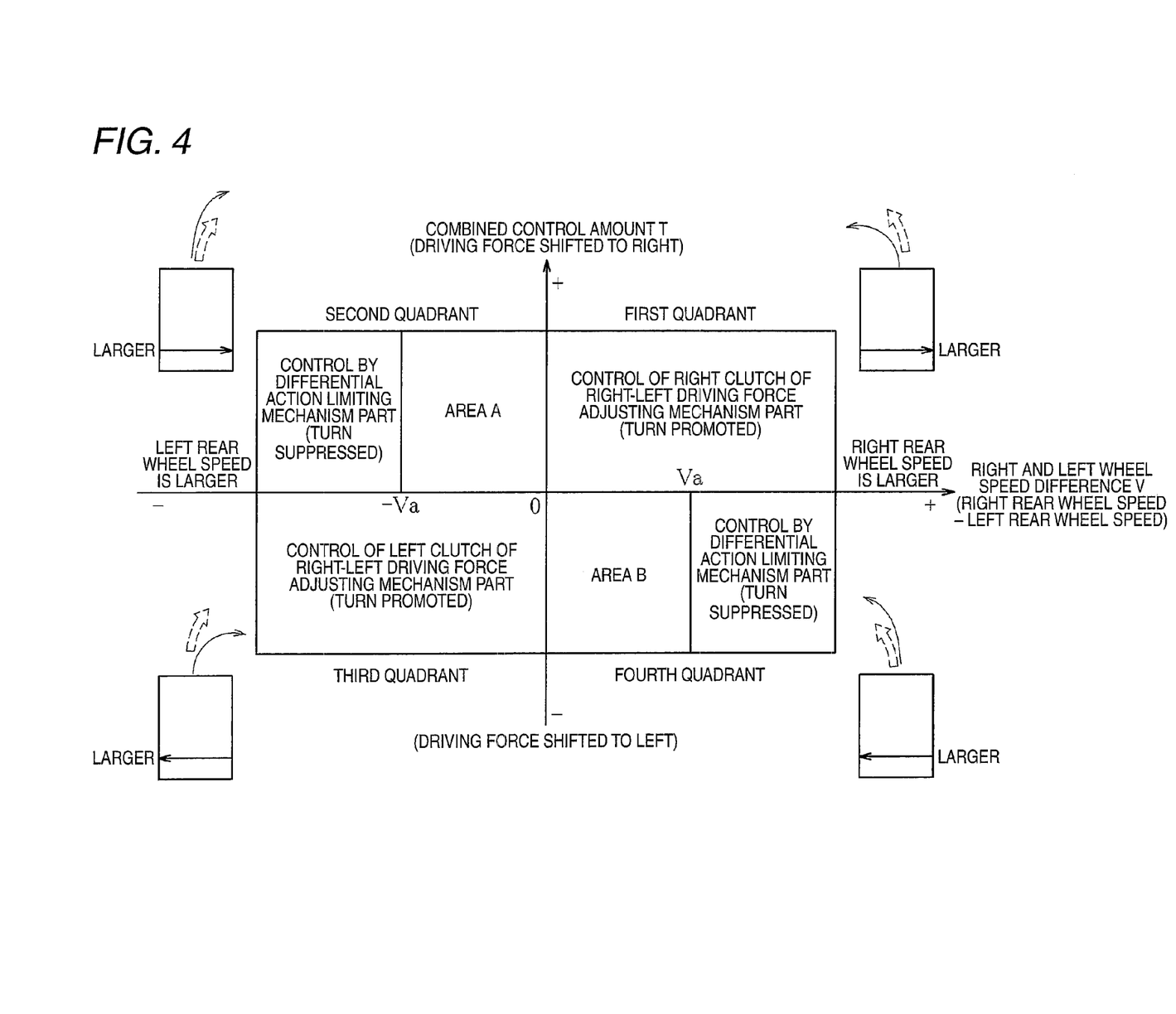
FIG. 4 is a control map according to a first embodiment which implements a driving force control selection based on a driving force shifting direction and a wheel speed difference.

For example, as is shown in FIG. 4, the driving force control selecting part 70 selects either the right-left driving force adjusting control or the differential action limiting control based on the control map for driving force control selection in which a combined control amount T in which the driving force shifting direction to the right rear wheel 6R is referred to as being positive and the driving force shifting direction to the left rear wheel 6L is referred to as being negative is referred to as the axis of ordinates and a right and left wheel speed difference V in which a case where the wheel speed of the right rear wheel 6R is larger than that of the left rear wheel 6L is referred to as being positive and a case where the wheel speed of the left rear wheel 6L is larger than that of the right rear wheel 6R is referred to as being negative is referred to as the axis of abscissa.

(First Embodiment)

In the control map shown in FIG. 4, in the event that the driving force shifting direction in the combined control amount T and the direction towards the wheel which has the larger wheel speed are the same, that is, when the vehicle is in running states which correspond to first and third quadrants, the driving force control selecting part 70 is set in such a manner as to select the right-left driving force adjusting control by the right-left driving force adjusting mechanism part 28.

Namely, when the vehicle is in the running states corresponding to the first and third quadrants, the driving force control selecting part 70 selects the right-left driving force adjusting control in such a manner that the driving force is made to shift to the outer wheel side relative to the turning direction of the vehicle 1 so that the driving force is made to act in a direction in which the turn of the vehicle is promoted, that is, towards the oversteer side. In addition, when the vehicle is in the running state corresponding to the first quadrant, the right clutch 34 of the right-left driving force adjusting mechanism part 28 is made to be engaged in accordance with the combined control amount, whereas when the vehicle is in the running state corresponding to the third quadrant, the left clutch 36 is made to be engaged in the same manner.

On the other hand, in the control map shown in FIG. 4, in the event that the driving force shifting direction in the combined control amount T and the direction towards the wheel which has the smaller wheel speed are the same, that is, when the vehicle is in running states which correspond to a second quadrant and a fourth quadrant, the driving force control selecting part 70 is set in such a manner that the different controls are implemented across predetermined wheel speed differences Va, −Va (hereinafter, both the differences being referred to as a predetermined wheel speed difference |Va| as well) as boundaries.

Specifically, in the event that the vehicle is in the running states corresponding to the second quadrant and the fourth quadrant and the right and left wheel speed difference |V| is equal to or larger than the predetermined wheel speed difference |Va|, that is, in the event that V<−Va or Va<V, the driving force control selecting part 70 is set in such a manner as to select the differential action limiting control by the differential action limiting mechanism part 30. Namely, in the event that the vehicle is in such running states, the driving force control selecting part 70 selects the differential action limiting control in which the driving force is made to shift to the inner wheel side relative to the turning direction of the vehicle 1 so that the driving force acts in the direction in which the turn of the vehicle is suppressed or towards the understeer side. In addition, as this occurs, the differential action limiting clutch 38 of the differential action limiting mechanism part 30 is made to be engaged in accordance with the combined control amount.

In addition, in the event that the vehicle is in the running states corresponding to the second quadrant and the fourth quadrant and the right and left wheel speed difference |V| is less than the predetermined wheel speed difference |Va|, that is, in the event that the vehicle's running state is in areas A, B which are defined as −Va<V<Va, the driving force control selecting part 70 is set in such a manner as to maintain the driving force control which has been lately executed.

However, in the event that the running state of the vehicle varies between the area A and the area B, the driving force control selecting part 70 is set in such a manner as to select the differential action limiting control. Namely, in the event that the direction of the right and left wheel speed difference V is reversed left to right or vice versa at the same time as the driving force shifting direction is reversed left to right or vice versa in the combined control amount T between the second quadrant and the fourth quadrant, the driving force control selecting part 70 is made to select the differential action limiting control even though the right-left driving force adjusting control has been lately selected.

Hereinafter, the function of the right-left driving force control system according to the invention which is configured as has been described heretofore will be described.

Figure 5:
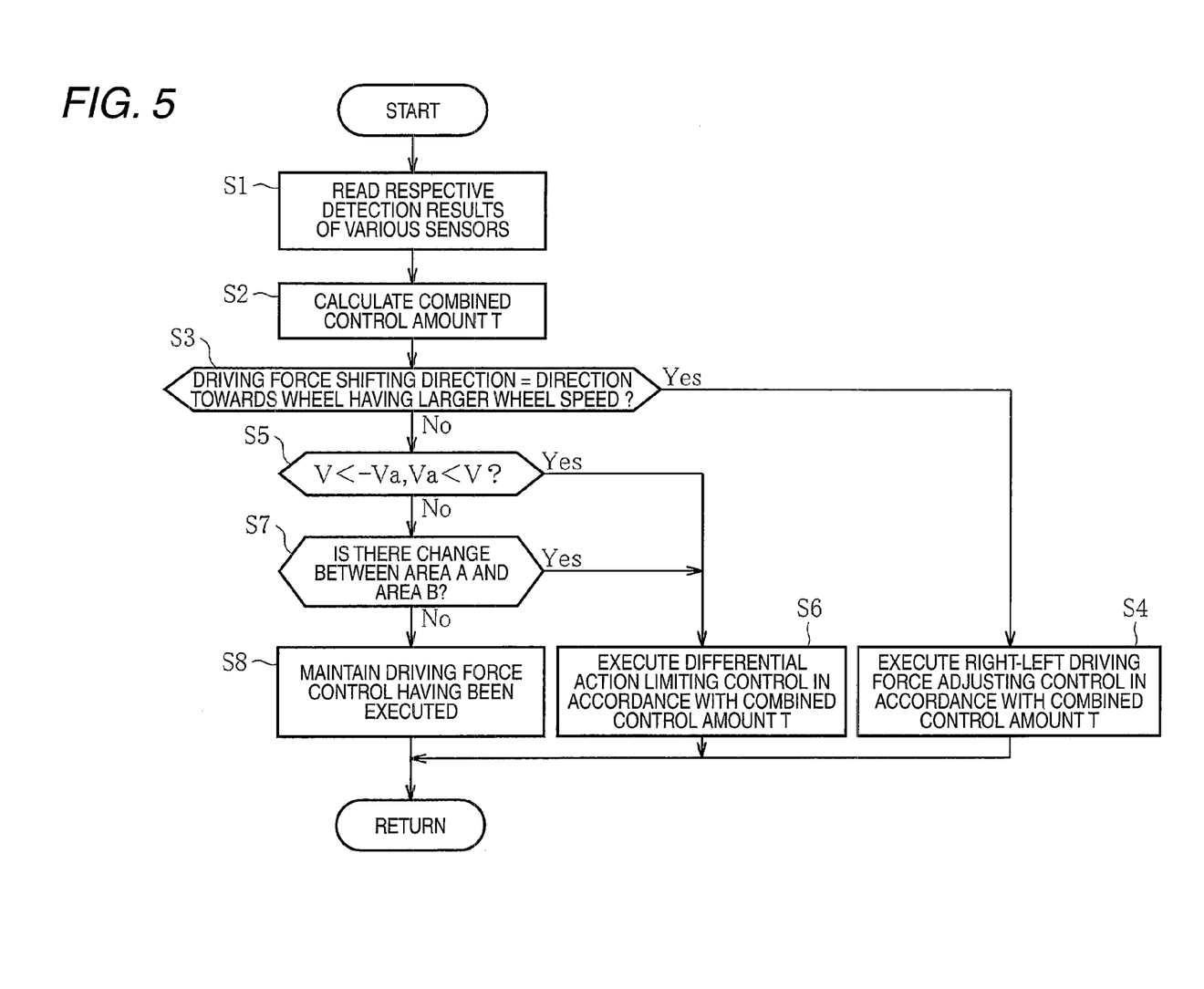
FIG. 5 is a flowchart showing a right-left driving force control routine according to the first embodiment which is executed in the right-left driving force control system according to the invention.

Referring to FIG. 5, a right-left driving force control routine which is executed in the right-left driving force control system according to the invention is shown in the form of a flowchart, and hereinafter, the function of the right-left driving force control system will be described based on the flowchart.

Firstly, as step S1, the ECU 60 reads the detection results of the various sensors such as the yaw rate sensor 46, the steering angle sensor 48, the vehicle body speed sensor 50, the respective wheel speed sensors 42L, 42R, 44L, 44R, and the throttle position sensor 52.

In step S2 which follows step S1, at the combined control amount calculating part 68, the first control amount which is calculated at the first control amount calculating part 62 and the third control amount which is calculated at the third control amount calculating part 66 are added together to calculate a combined control amount T.

In step S3, it is determined whether or not the driving force shifting direction included in (related to) the combined control amount which is calculated in step S2 and the direction towards the wheel of the rear wheels 6 which has the larger wheel speed are the same. Namely, it is determined whether or not the running state of the vehicle then corresponds to the first quadrant or the third quadrant in the control map shown in FIG. 4.

If the result of the determination is true (Yes), the right-left driving force control routine proceeds to step S4.

In step S4, the right-left driving force adjusting control is executed in accordance with the combined control amount T which is calculated in step S2 above, and the routine in question returns to the starting step. Namely, in step S4, if the combined control amount T is positive, the right clutch 34 of the right-left driving force adjusting mechanism part 28 is controlled to be engaged, whereas if the same amount is negative, the left clutch 36 is controlled to be engaged.

On the other hand, if the result of the detection carried out in step S3 is false (No), that is, in the event that the driving force shifting direction in the combined control amount T is the same as the direction towards the wheel which has the smaller wheel speed and the running state of the vehicle then corresponds to the second quadrant or the fourth quadrant of the control map shown in FIG. 4, the routine proceeds to step S5.

In step S5, it is determined whether or not the right and left wheel speed difference |V| is equal to or larger than the predetermined wheel speed difference |Va|, that is, whether or not V<−Va or Va<V is satisfied.

If the result of the determination is true (Yes), the routine proceeds to step S6.

In step S6, the differential action limiting clutch 38 of the differential action limiting mechanism part 30 is controlled to be engaged in accordance with the combined control amount which is calculated in step S2 above, and the routine returns to the starting step.

On the other hand, if the result of the determination in step S5 above is false (No), that is, in the event that the running state of the vehicle then corresponds to those of the area A or area B in the control map shown in FIG. 4, the routine proceeds to step S7.

In step S7, it is determined whether or not there is a change in the running state of the vehicle occurring between the area A and the area B in the control map shown in FIG. 4.

If the result of the determination is true (Yes), the routine proceeds to step S6 above. Namely, for example, in the event that the running state of the vehicle changes from the running state (the area A) in which the wheel speed difference V is negative, that is, the wheel speed of the left wheel is larger than that of the right wheel and the combined control amount T is positive to the running state (the area B) in which the wheel speed difference is positive, that is, the wheel speed of the right wheel is larger than that of the left wheel and the combined control amount T is negative, or on the contrary, in the event that the running state of the vehicle changes from the area B to the area A, the routine proceeds to step S6, so as to execute the differential action limiting control.

On the other hand, if the result of the determination in step S7 above is false (No), that is, in the event that there is occurring no change in the running state of the vehicle between the area A and the area B but the running state of the vehicle is such as to correspond to the running state of the area A or the area B, the routing proceeds to step S8.

In step S8, the driving force control that has been lately selected, that is, the driving force control that is selected in the driving force control routine occurring one cycle before the current one is held in operation, and the current driving force control routine returns to the starting step. Namely, in the event that the running state of the vehicle changes from the running state corresponding to the first quadrant and the third quadrant to the running state corresponding to the area A or the area B, the right-left driving force adjusting control is maintained, whereas in the event that the running state of the vehicle changes from the area where the wheel speed difference |V| in the second quadrant and the fourth quadrant is equal to or larger than the predetermined wheel speed difference |Va| to the area A or the area B, the differential action limiting control is maintained.

Thus, as has been described heretofore, in the right-left driving force control system according to the invention, the right-left driving force distributing unit 20 includes the right-left driving force adjusting mechanism part 28 and the differential action limiting mechanism part 30, and the combined control amount T is calculated which corresponds to the right-left driving force adjusting mechanism part 28 and the differential action limiting mechanism part 30, either of the right-left driving force adjusting mechanism part 28 and the differential action limiting mechanism part 30 is selected, and the mechanism part so selected is controlled in accordance with the single control amount T.

Consequently, not only can the concurrent use of the right-left driving force adjusting mechanism part 28 and the differential action limiting mechanism part 30 be prevented, but also the drastic change in driving force difference can be suppressed which would otherwise take place when the right-left driving force adjusting control and the differential action limiting control are switched over.

In addition, the selection between the right-left driving force adjusting control and the differential action limiting control is implemented based on the combined control amount T and the right and left wheel speed difference V as is shown in the control map shown in FIG. 4.

Since the driving force control that has been lately selected is maintained in the areas A, B in the control map shown in FIG. 4, the frequent switching between the right-left driving force adjusting mechanism part and the differential action limiting mechanism part can be reduced which takes place due to variation of the vehicle's running state between the area A and the area B.

Further, in the event that there is a change in the running state of the vehicle occurring between the area A and the area B, the differential action limiting control is made to be selected, and consequently, when the straight ahead running state is attempted to be maintained, no driving force adjusting control is not implemented in which the driving force is distributed to either of the right and left wheels, but by selecting the differential action limiting control in an ensured fashion, the straight ahead running stability of the vehicle can be increased.

In addition, by using the differential action limiting mechanism part 30 which consumes less energy in place of the right-left driving force adjusting mechanism part 28 when the turn of the vehicle is suppressed, the energy consumption can be suppressed, and consequently, an increase in fuel economy can also be realized.

Thus, according to the first embodiment of the right-left driving force control system of the invention, since hunting between the right-left driving force adjusting control and the differential action limiting control can be reduced and the drastic change in driving force difference can also be suppressed which would otherwise occur when the driving force controlling operations are switched over, the discontinuity in the behavior of the vehicle can be suppressed.

In this way, in the right-left driving force control system according to the invention, the driving force adjusting mechanism part and the differential action limiting mechanism part can independently be used as required, while the behavior of the vehicle is maintained stable in accordance with the running state of the vehicle.

Thus, the description of the first embodiment of the right-left driving force control system according to the invention ends. However, the mode for carrying out the invention is not limited to the first embodiment.

While in the first embodiment, the control map shown in FIG. 4 is used for driving force control selection, the control map is not limited to the one shown in FIG. 4.

Figure 6:
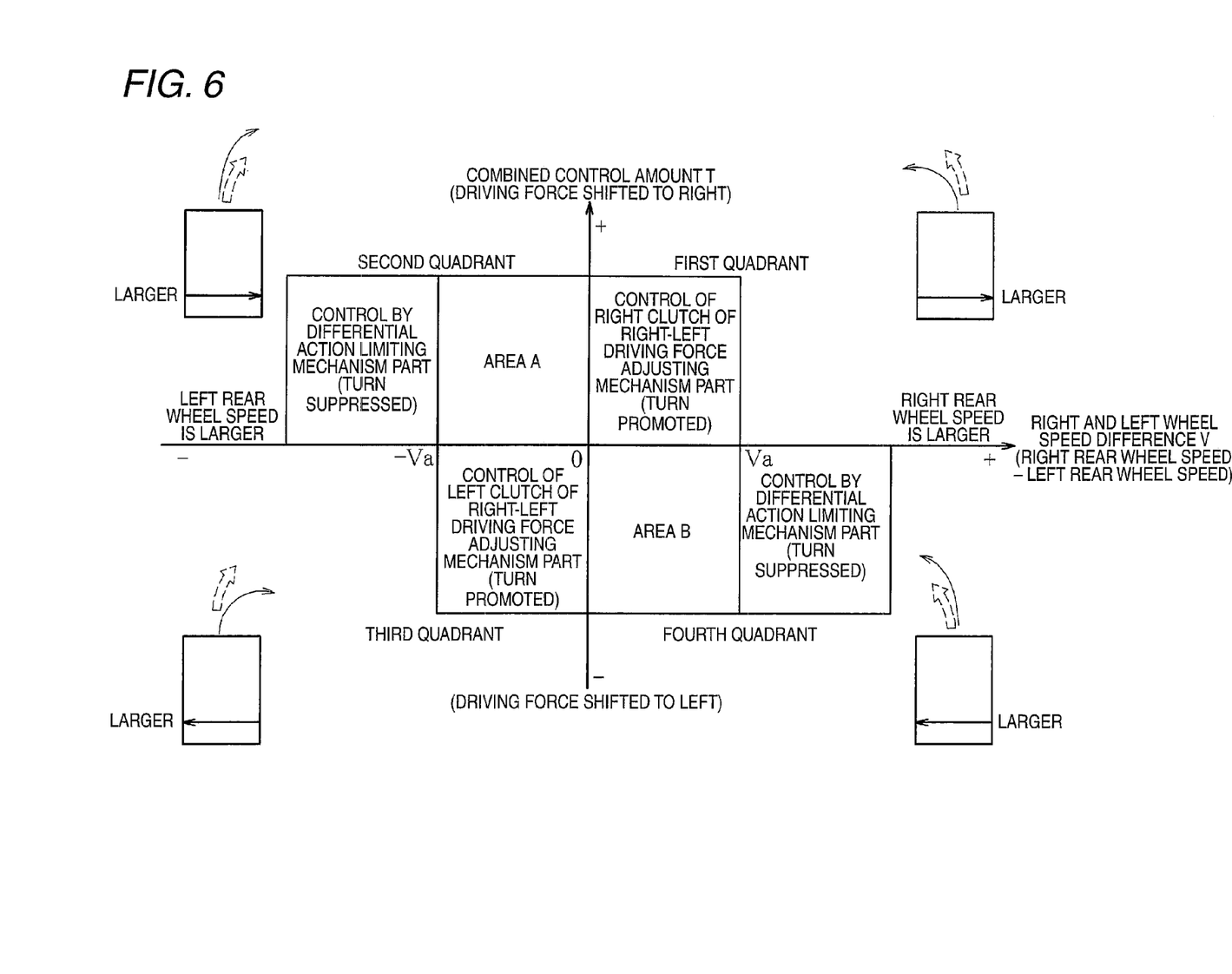
FIG. 6 is a modified control map to the control map in FIG. 4 which implements a driving force control selection based on the driving force shifting direction and the wheel speed difference.

For example, since the right-left driving force adjusting mechanism part 28 generally has the controllable right and left wheel speed difference V which is larger than that of the differential action limiting mechanism part 30, as a first modified example to the control map shown in FIG. 4, there will be no problem in the event that a control map as is shown in FIG. 6 maybe adopted in which in the second and fourth quadrants, the predetermined wheel speed difference |Va| is set to a right and left wheel speed difference which forms the limit of control by the right-left driving force adjusting mechanism part, whereby in the event that the right and left wheel speed difference reaches or exceeds the controllable wheel speed difference limit so set, the differential action limiting control is set to be activated.

In this modified example, the driving force control for the running state of the vehicle which corresponds to those of the second and fourth quadrants, that is, for suppression the turn of the vehicle can be executed over a wider range than when the driving force control is implemented only through the right-left driving force control.

(Second Embodiment)

Figure 7:
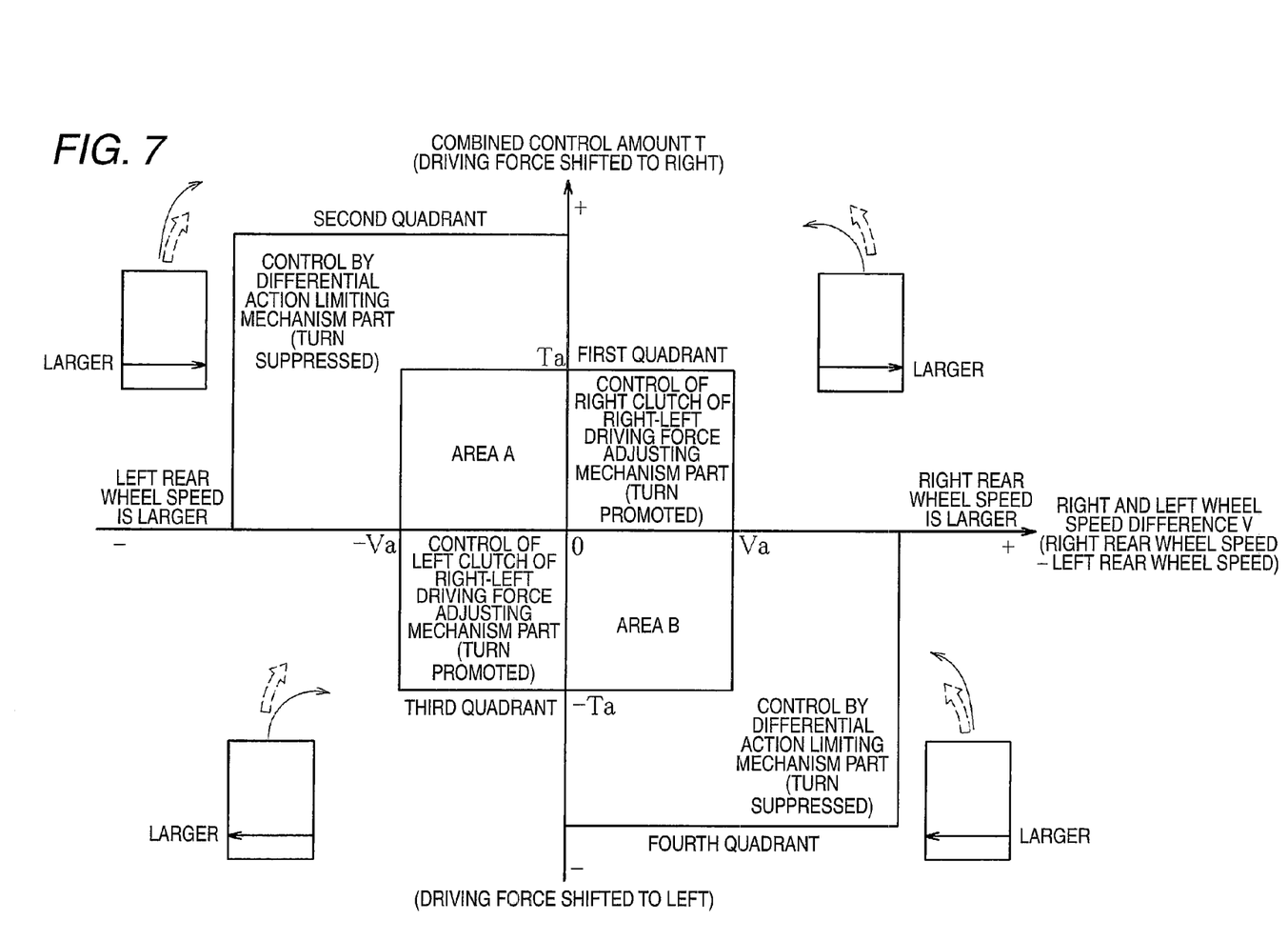
FIG. 7 is a control map according to a second embodiment which implements a driving force control selection based on a driving force shifting direction and a wheel speed difference.

In a control map shown in FIG. 7, in the event that the driving force shifting direction in the combined control amount T and the direction towards the wheel which has the larger wheel speed are the same, that is, when the vehicle is in running states which correspond to first and third quadrants, the driving force control selecting part 70 is set in such a manner as to select the right-left driving force adjusting control by the right-left driving force adjusting mechanism part 28.

Namely, when the vehicle is in the running states corresponding to the first and third quadrants, the driving force control selecting part 70 selects the right-left driving force adjusting control in such a manner that the driving force is made to shift to the outer wheel side relative to the turning direction of the vehicle 1 so that the driving force is made to act in a direction in which the turn of the vehicle is promoted, that is, towards the oversteer side. In addition, when the vehicle is in the running state corresponding to the first quadrant, the right clutch 34 of the right-left driving force adjusting mechanism part 28 is made to be engaged in accordance with the combined control amount, whereas when the vehicle is in the running state corresponding to the third quadrant, the left clutch 36 is made to be engaged in the same manner.

On the other hand, in the control map shown in FIG. 7, in the event that the driving force shifting direction in the combined control amount T and the direction towards the wheel which has the smaller wheel speed are the same, that is, when the vehicle is in running states which correspond to a second quadrant and a fourth quadrant, the driving force control selecting part 70 is set in such a manner that the different controls are implemented across predetermined control amounts Ta, −Ta (hereinafter, both the amounts being referred to as a predetermined control amount |Ta| as well) and predetermined wheel speed differences Va, −Va (hereinafter, both the differences being referred to as a predetermined wheel speed difference |Va| as well) as boundaries. Note that generally, the differential action limiting mechanism part 30 has larger limits with respect to combined control amount T and right and left wheel speed difference V that can be controlled thereby than those of the right-left driving force adjusting mechanism part 28, and the predetermined control amount |Ta| and the predetermined wheel speed difference |Va| are set to a combined control amount T and a wheel speed difference V which correspond to the combined control amount and wheel speed difference which form limits that can be controlled by the right-left driving force adjusting mechanism part 28.

Specifically, in the event that the vehicle is in the running states corresponding to the second quadrant and the fourth quadrant and the combined control amount |T| is equal to or larger than the predetermined control amount |Ta| or the right and left wheel speed difference |V| is equal to or larger than the predetermined wheel speed difference |Va|, that is, in the event that V<−Va or Va<V, or T<−Ta or Ta<T, the driving force control selecting part 70 is set in such a manner as to select the differential action limiting control by the differential action limiting mechanism part 30. Namely, in the event that the vehicle is in such running states, the driving force control selecting part 70 selects the differential action limiting control in which the driving force is made to shift to the inner wheel side relative to the turning direction of the vehicle 1 so that the driving force acts in the direction in which the turn of the vehicle is suppressed or towards the understeer side. In addition, as this occurs, the differential action limiting clutch 38 of the differential action limiting mechanism part 30 is made to be engaged in accordance with the combined control amount.

In addition, in the event that the vehicle is in the running states corresponding to the second quadrant and the fourth quadrant and the combined control amount |T| is less than the predetermined control amount |Ta| and the right and left wheel speed difference |V| is less than the predetermined wheel speed difference |Va|, that is, in the event that the vehicle's running state is in areas A, B which are defined as −Ta<T<Ta and −Va<V<Va, the driving force control selecting part 70 is set in such a manner as to maintain the driving force control which has been lately executed.

However, in the event that the running state of the vehicle varies between the area A and the area B, the driving force control selecting part 70 is set in such a manner as to select the differential action limiting control. Namely, in the event that the direction of the right and left wheel speed difference V is reversed left to right or vice versa at the same time as the driving force shifting direction is reversed left to right or vice versa in the combined control amount T between the second quadrant and the fourth quadrant, the driving force control selecting part 70 is made to select the differential action limiting control even though the right-left driving force adjusting control has been lately selected.

Hereinafter, the function of the right-left driving force control system according to the invention which is configured as has been described heretofore will be described.

Figure 8:
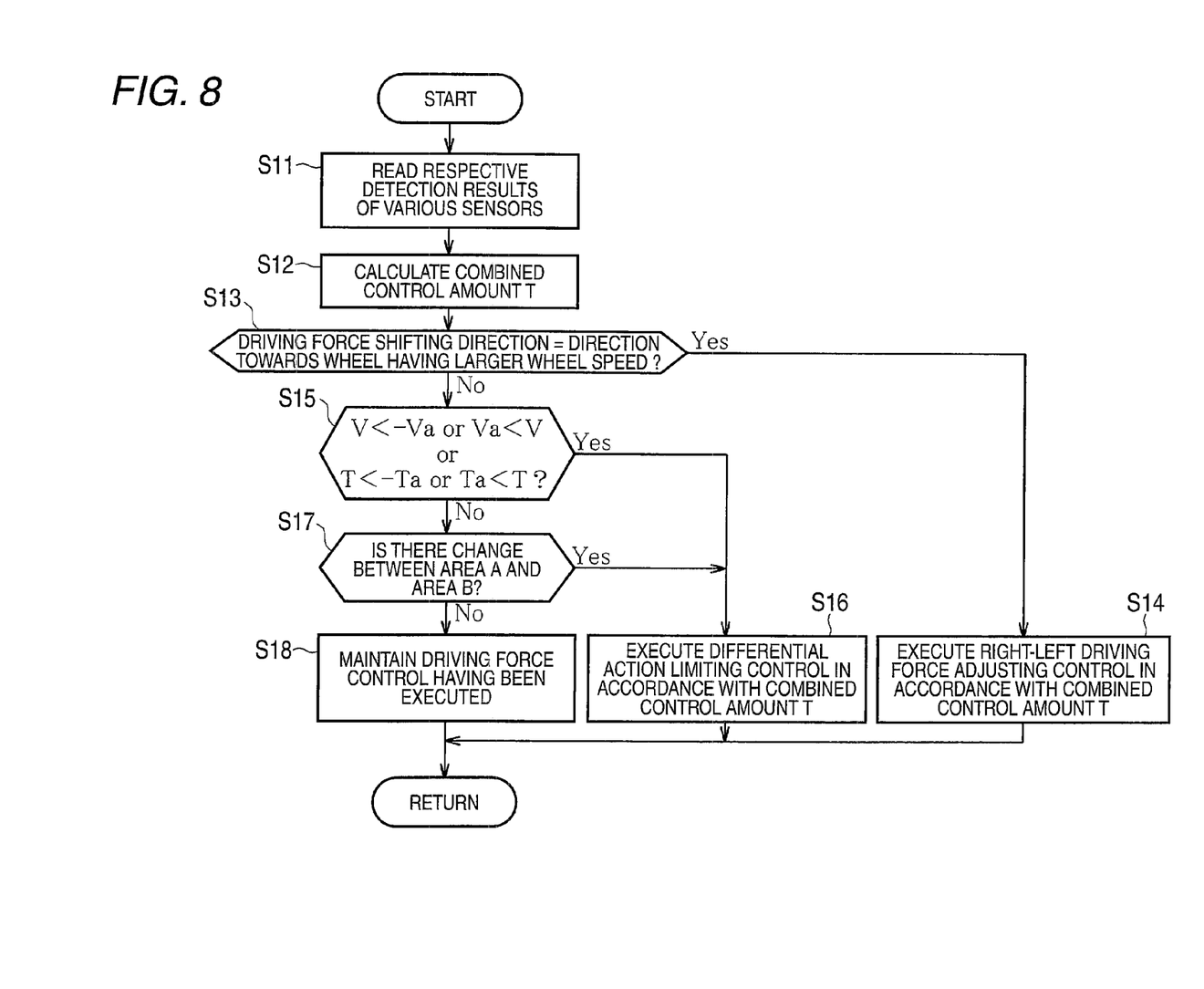
FIG. 8 is a flowchart showing a right-left driving force control routine according to the second embodiment which is executed in the right-left driving force control system according to the invention.

Referring to FIG. 8, a right-left driving force control routine which is executed in the right-left driving force control system according to the invention is shown in the form of a flowchart, and hereinafter, the function of the right-left driving force control system will be described based on the flowchart.

Firstly, as step S11, the ECU 60 reads the detection results of the various sensors such as the yaw rate sensor 46, the steering angle sensor 48, the vehicle body speed sensor 50, the respective wheel speed sensors 42L, 42R, 44L, 44R, and the throttle position sensor 52.

In step S12 which follows step S1, at the combined control amount calculating part 68, the first control amount which is calculated at the first control amount calculating part 62 and the third control amount which is calculated at the third control amount calculating part 66 are added together to calculate a combined control amount T.

In step S13, it is determined whether or not the driving force shifting direction included in (related to) the combined control amount which is calculated in step S12 and the direction towards the wheel of the rear wheels 6 which has the larger wheel speed are the same. Namely, it is determined whether or not the running state of the vehicle then corresponds to the first quadrant or the third quadrant in the control map shown in FIG. 7.

If the result of the determination is true (Yes), the right-left driving force control routine proceeds to step S14.

In step S14, the right-left driving force adjusting control is executed in accordance with the combined control amount T which is calculated in step S12 above, and the routine in question returns to the starting step. Namely, in step S14, if the combined control amount T is positive, the right clutch 34 of the right-left driving force adjusting mechanism part 28 is controlled to be engaged, whereas if the same amount is negative, the left clutch 36 is controlled to be engaged.

On the other hand, if the result of the detection carried out in step S13 is false (No), that is, in the event that the driving force shifting direction in the combined control amount T is the same as the direction towards the wheel which has the smaller wheel speed and the running state of the vehicle then corresponds to the second quadrant or the fourth quadrant of the control map shown in FIG. 7, the routine proceeds to step S15.

In step S15, it is determined whether or not the combined control amount |T| is equal to or larger than the predetermined control amount |Ta| or the right and left wheel speed difference |V| is equal to or larger than the predetermined wheel speed difference |Va|, that is, whether or not T<−Ta or Ta<T or V<−Va or Va<V is satisfied.

If the result of the determination is true (Yes), the routine proceeds to step S16.

In step S16, the differential action limiting clutch 38 of the differential action limiting mechanism part 30 is controlled to be engaged in accordance with the combined control amount which is calculated in step S12 above, and the routine returns to the starting step.

On the other hand, if the result of the determination in step S15 above is false (No), that is, in the event that the running state of the vehicle then corresponds to those of the area A or area B in the control map shown in FIG. 7, the routine proceeds to step S17.

In step S17, it is determined whether or not there is a change in the running state of the vehicle occurring between the area A and the area B in the control map shown in FIG. 7.

If the result of the determination is true (Yes), the routine proceeds to step S16 above. Namely, for example, in the event that the running state of the vehicle changes from the running state (the area A) in which the wheel speed difference V is negative, that is, the wheel speed of the left wheel is larger than that of the right wheel and the combined control amount T is positive to the running state (the area B) in which the wheel speed difference is positive, that is, the wheel speed of the right wheel is larger than that of the left wheel and the combined control amount T is negative, or on the contrary, in the event that the running state of the vehicle changes from the area B to the area A, the routine proceeds to step S16, so as to execute the differential action limiting control.

On the other hand, if the result of the determination in step S17 above is false (No), that is, in the event that there is occurring no change in the running state of the vehicle between the area A and the area B but the running state of the vehicle is such as to correspond to the running state of the area A or the area B, the routing proceeds to step S18.

In step S18, the driving force control that has been lately selected, that is, the driving force control that is selected in the driving force control routine occurring one cycle before the current one is held in operation, and the current driving force control routine returns to the starting step. Namely, in the event that the running state of the vehicle changes from the running state corresponding to the first quadrant and the third quadrant to the running state corresponding to the area A or the area B, the right-left driving force adjusting control is maintained, whereas in the event that the running state of the vehicle changes from the area where the combined control amount |T| in the second quadrant and the fourth quadrant is equal to or larger than the predetermined control amount |Ta| or the wheel speed difference |V| in the second quadrant and the fourth quadrant is equal to or larger than the predetermined wheel speed difference |Va| to the area A or the area B, the differential action limiting control is maintained.

Thus, as has been described heretofore, in the right-left driving force control system according to the invention, the right-left driving force distributing unit 20 includes the right-left driving force adjusting mechanism part 28 and the differential action limiting mechanism part 30, and the combined control amount T is calculated which corresponds to the right-left driving force adjusting mechanism part 28 and the differential action limiting mechanism part 30, either of the right-left driving force adjusting mechanism part 28 and the differential action limiting mechanism part 30 is selected, and the mechanism part so selected is controlled in accordance with the single control amount T.

Consequently, not only can the concurrent use of the right-left driving force adjusting mechanism part 28 and the differential action limiting mechanism part 30 be prevented, but also the drastic change in driving force difference can be suppressed which would otherwise take place when the right-left driving force adjusting control and the differential action limiting control are switched over.

In addition, the selection between the right-left driving force adjusting control and the differential action limiting control is implemented based on the combined control amount T and the right and left wheel speed difference V as is shown in the control map shown in FIG. 7.

Since the driving force control that has been lately selected is maintained in the areas A, B in the control map shown in FIG. 7, the frequent switching between the right-left driving force adjusting mechanism part and the differential action limiting mechanism part can be reduced which takes place due to variation of the vehicle's running state between the area A and the area B.

Further, in the event that there is a change in the running state of the vehicle occurring between the area A and the area B, the differential action limiting control is made to be selected, and consequently, when the straight ahead running state is attempted to be maintained, no driving force adjusting control is not implemented in which the driving force is distributed to either of the right and left wheels, but by selecting the differential action limiting control in an ensured fashion, the straight ahead running stability of the vehicle can be increased.

In addition, by selecting the differential action limiting mechanism part 30 in the running state corresponding to the other areas than the areas A, B in the second and fourth quadrants, the driving force control can be executed over a wider range than when the driving force control is executed only by the right-left driving force adjusting mechanism part 28.

Additionally, by using the differential action limiting mechanism part 30 which consumes less energy in place of the right-left driving force adjusting mechanism part 28 when the turn of the vehicle is suppressed, the energy consumption can be suppressed, and consequently, an increase in fuel economy can also be realized.

Thus, according to the second embodiment of the right-left driving force control system of the invention, since hunting between the right-left driving force adjusting control and the differential action limiting control can be reduced and the drastic change in driving force difference can also be suppressed which would otherwise occur when the driving force controlling operations are switched over, the discontinuity in the behavior of the vehicle can be suppressed.

In this way, in the right-left driving force control system according to the invention, the driving force adjusting mechanism part and the differential action limiting mechanism part can independently be used as required, while the behavior of the vehicle is maintained stable in accordance with the running state of the vehicle.

Thus, the description of the second embodiment of the right-left driving force control system according to the invention ends.

Note that while in the first embodiment and the second embodiment, the vehicle 1 is described as being the four-wheel-drive vehicle, the invention can be applied to a two-wheel-drive vehicle, as well.

In addition, while in the first embodiment and the second embodiment, in the right-left driving force distributing unit 20, the right-left driving force adjusting mechanism part 28 is disposed rightwards of the differential mechanism part 26 and the differential action limiting mechanism part 30 is disposed leftwards of the differential mechanism part 26, the right-left driving force distributing unit 20 is not limited to the configuration described in the embodiments. In the right-left driving force control system according to the invention, any other configurations may be adopted provided that the right-left driving force adjusting unit and the differential action limiting unit are included in the configuration so adopted.

In addition, while in the first embodiment and the second embodiment, the combined control amount is described as being calculated from the detection results from the yaw rate sensor 46, the steering angle sensor 48, the vehicle body speed sensor 50, the wheel speed sensors 42L, 42R, 44L, 44R and the throttle position sensor 52, the combined control amount only has to be a control amount which corresponds to the right-left driving force adjusting mechanism part 28 and the differential action limiting mechanism part 30, and the invention is not limited to the configuration described in the second embodiment.

Additionally, while in the first embodiment and the second embodiment, the combined control amount is described as being calculated by adding up the third control amount and the first control amount as they are, the invention is not limited thereto. For example, to change the weighting of the third control amount and the first control amount, either or both of the first and third control amounts may be multiplied by a coefficient, and thereafter, the resulting control amounts are added up to calculate a combined control amount.

What is claimed is:

1. A right-left driving force control system comprising:
 a adjusting unit which adjusts distribution of a driving force between right and left wheels of a vehicle;

a limiting unit which adjusts a differential action limiting force that is to be applied between the right and left wheels so as to limit a differential action between the right and left wheels;

a detecting unit which detects wheel speeds of the right and left wheels;

a calculating unit which calculates a control amount in accordance with a running state of the vehicle;

a selecting unit which:

selects the adjusting unit, when a shifting direction in which the driving force is shifted between the right and left wheels and which is related to the control amount is the same as a first direction towards one of the right and left wheels which has a larger wheel speed of the right and left wheel speeds;

selects the limiting unit, when the shifting direction is the same as a second direction towards one of the right and left wheels which has a smaller wheel speed of the right and left wheel speeds, and a difference between the right and left wheel speeds is equal to or larger than a first threshold value; and     maintains the adjusting unit or the limiting unit, which has been selected, when the shifting direction is the same as the second direction, and the difference between the right and left wheel speeds is less than the first threshold value; and a control unit which controls the adjusting unit or the limiting unit, which is selected or maintained by the selecting unit, based on the control amount.

2. The right-left driving force control system according to claim 1, wherein the selecting unit selects the limiting unit, when a direction indicated by the difference between the right and left wheel speeds is reversed left to right or vice versa at the same time as the shifting direction is reversed left to right or vice versa from a state in which the shifting direction is the same as the second direction, and the difference between the right and left wheel speeds is less than the first threshold value.

3. The right-left driving force control system according to claim 1, wherein the selecting unit sets the first threshold value to a limit value which can be controlled by the adjusting unit.

4. The right-left driving force control system according to claim 1, wherein the selecting unit:

selects the limiting unit, when the shifting direction is the same as the second direction, and the control amount is equal to or larger than a second threshold value; and     maintains the adjusting unit or the limiting unit, which has been selected, when the shifting direction is the same as the second direction, and the control amount is less than the second threshold value.

5. The right-left driving force control system according to claim 4, wherein the selecting unit selects the limiting unit, when a direction indicated by the difference between the right and left wheel speeds is reversed left to right or vice versa at the same time as the shifting direction is reversed left to right or vice versa from a state in which the shifting direction is the same as the second direction, and the control amount is less than the second threshold value.

6. The right-left driving force control system according to claim 4, wherein the selecting unit sets the second threshold value to a limit value that can be controlled by the adjusting unit.

* * * * *